(12) United States Patent
Orava et al.

(10) Patent No.: US 7,359,989 B2
(45) Date of Patent: Apr. 15, 2008

(54) ADDRESSING IN WIRELESS LOCAL AREA NETWORKS

(75) Inventors: Pekko Orava, Tampere (FI); Jukka-Pekka Honkanen, Tampere (FI); Henry Haverinen, Tampere (FI); Jouni Mikkonen, Tampere (FI); Markku T. Niemi, Tampere (FI)

(73) Assignee: Nokia Corporation, Espoo (FI)

( * ) Notice: Subject to any disclaimer, the term of this patent is extended or adjusted under 35 U.S.C. 154(b) by 668 days.

(21) Appl. No.: 10/310,222

(22) Filed: Dec. 5, 2002

(65) Prior Publication Data
US 2003/0177267 A1 Sep. 18, 2003

(30) Foreign Application Priority Data
Jan. 18, 2002 (FI) .................................. 20020101
Apr. 18, 2002 (WO) ....................... PCT/IB02/01273

(51) Int. Cl.
*G06F 15/16* (2006.01)
(52) U.S. Cl. ...................... 709/245; 709/203; 709/222; 709/226; 709/248; 370/392; 370/475
(58) Field of Classification Search ................ 709/203, 709/245, 248, 222, 226; 370/392, 475
See application file for complete search history.

(56) References Cited

U.S. PATENT DOCUMENTS

| 6,567,396 B1* | 5/2003 | Pohjanvouri et al. ....... 370/349 |
|---|---|---|
| 6,570,857 B1* | 5/2003 | Haartsen et al. ............ 370/312 |
| 6,587,396 B1* | 7/2003 | Jang ........................... 438/259 |
| 6,609,152 B1* | 8/2003 | Ono ............................ 709/222 |
| 6,836,862 B1* | 12/2004 | Erekson et al. ............. 714/704 |
| 2001/0017856 A1 | 8/2001 | Asokan et al. |
| 2004/0006642 A1* | 1/2004 | Jang et al. ................... 709/245 |
| 2006/0104245 A1* | 5/2006 | Narayanaswami et al. .. 370/332 |
| 2006/0120317 A1* | 6/2006 | Zheng ......................... 370/315 |
| 2007/0019609 A1* | 1/2007 | Anjum ....................... 370/349 |

FOREIGN PATENT DOCUMENTS

| EP | 0 982 963 A2 | 3/2000 |
|---|---|---|
| EP | 1 022 884 A1 | 7/2000 |
| EP | 0 982 963 A3 | 5/2001 |
| WO | WO96/39769 | 12/1996 |
| WO | WO99/37106 | 7/1999 |
| WO | WO 01/15387 | 3/2001 |

* cited by examiner

*Primary Examiner*—Saleh Najjar
*Assistant Examiner*—Shawki S Ismail
(74) *Attorney, Agent, or Firm*—Hollingsworth & Funk, LLC

(57) ABSTRACT

The invention relates to a method of transferring required messages for acquiring a temporary MAC address in a wireless local area network. In a first device in the local area network, a first identifier is determined to identify the first device. A message comprising the first identifier is transmitted from the first device to a second device to arrange a temporary MAC address. A response message relating to the acquisition of the MAC address and comprising the first identifier is transmitted from the second device to the first device. The first device identifies on the basis of the first identifier that the response message is intended for it.

12 Claims, 6 Drawing Sheets

ADDRESSING IN WIRELESS LOCAL AREA NETWORKS

BACKGROUND OF THE INVENTION

The invention relates to arranging addressing in wireless local area networks and particularly to arranging temporary MAC addresses for wireless terminals.

In addition to data services provided by wired local area networks, several different wireless local area networks have been developed that provide wideband wireless data transmission service in a limited coverage area. These techniques include IEEE 802.11-based WLAN networks. These local area networks can be used to provide very fast data transmission and access to the Internet at different hot spots, such as in offices or at airports.

In wireless local area networks, the communicating devices are identified with fixed MAC (Medium Access Control) layer addresses of the data link layer L2 of the OSI model that are permanently assigned to them typically at the manufacturing stage. For instance, for WLAN networks according to IEEE 802.11 specifications, IEEE allocates an OUI identifier (Organizationally Unique Identifier) to each manufacturer, on the basis of which identifier the manufacturers can determine MAC addresses for the devices. In this way, it becomes possible to guarantee the global uniqueness of the MAC addresses; in other words no other WLAN device can have the same MAC address at the same time. However, the fixed MAC addresses determined by manufacturers cause a security risk: a MAC address can be picked up from every message transferred over the air interface and from RADIUS authentication packets also in other parts of the network. When the MAC address of the device is known, the movements of the device can be followed, and its traffic can be deliberately disturbed by causing collisions with packets by using a 'stolen' MAC address.

In order to arrange anonymity, it has been suggested that temporary random MAC addresses be used for WLAN networks. In such a case, the WLAN terminal could at first communicate through a well-known group address, such as a broadcast address. After allocation of a random MAC address to the terminal, the MAC address could be transmitted to the terminal by using the same group address, after which communication can be started with it to identify the terminal. However, two terminals might request for temporary MAC addresses substantially simultaneously. In such a case, both terminals may take into use the MAC address transmitted through the broadcast address of the network, whereby two terminals would have the same address in use.

BRIEF DESCRIPTION OF THE INVENTION

An object of the invention is thus to provide a method and equipment implementing the method in such a way that the above-mentioned problem could be avoided completely or at least most of the time when arranging temporary MAC addresses. Objects of the invention are achieved with a method, an arrangement, network elements and terminal devices characterized by what is disclosed in the independent claims. Preferred embodiments of the invention are disclosed in the dependent claims.

The invention is based on the idea that in order to arrange a temporary MAC address, a first identifier is determined in a first device of a wireless local area network in order to identify the first device. A message comprising the first identifier is transmitted from the first device to a second device in order to arrange the MAC address. A response message relating to the acquisition of the MAC address is transmitted from the second device to the first device, the message comprising the first identifier, and in the first device, the response message is identified on the basis of the first identifier to be intended for the first device.

An advantage of the invention is that the messages relating to the arrangement of temporary MAC addresses for terminals is that the messages can be identified, which allows the terminals to be distinguished from each other. When the first terminal is arranged to select the first identifier in such a way that it is with high probability unique, the collision risk can be reduced to be sufficiently small. The collision would require two terminals to determine exactly the same identifier and transmit it simultaneously to the same second device. Several ways to select the identifier can be used, with which the probability of such an event can be made very small.

In accordance with a first embodiment of the invention, the first identifier is a temporary MAC address suggested by the first device. Thus, the uniqueness of the first identifier is checked by the second device. If, on the basis of the checking, the first identifier is unique in a wireless local area network, the first identifier is used to identify the messages transmitted from the first device and addressed to it in the wireless local area network. This embodiment provides the advantage that the first device can suggest a temporary MAC address, and the uniqueness of the suggested MAC address can be ensured with checking performed by the second device.

In accordance with a second embodiment, the second device allocates a MAC address to the first device as a response to the message for arranging a temporary MAC address, the address being unique at least in a wireless local area network. The allocated MAC address is added to the response message, and once the response message has been transmitted, the MAC address can be used to identify the messages transmitted from the first device and addressed to it in the wireless local area network. Thus, the second device, which preferably has resources to check the uniqueness of the MAC address it has allocated or to directly allocate a unique identifier, can allocate a unique MAC address without there being a need for several messages between the first and the second device before a unique MAC address is found.

In accordance with yet another preferred embodiment, the first device is a wireless terminal and the second device is the access point of a wireless local area network, whereby the access point can perform centralized allocation of a MAC address and/or uniqueness checking for the terminals it serves that request for a temporary MAC address, utilizing optionally other services provided by the wireless local area network.

BRIEF DESCRIPTION OF THE FIGURES

The invention will now be described in more detail in connection with preferred embodiments, with reference to the attached drawings, of which

DETAILED DESCRIPTION OF THE INVENTION

Figure 1:
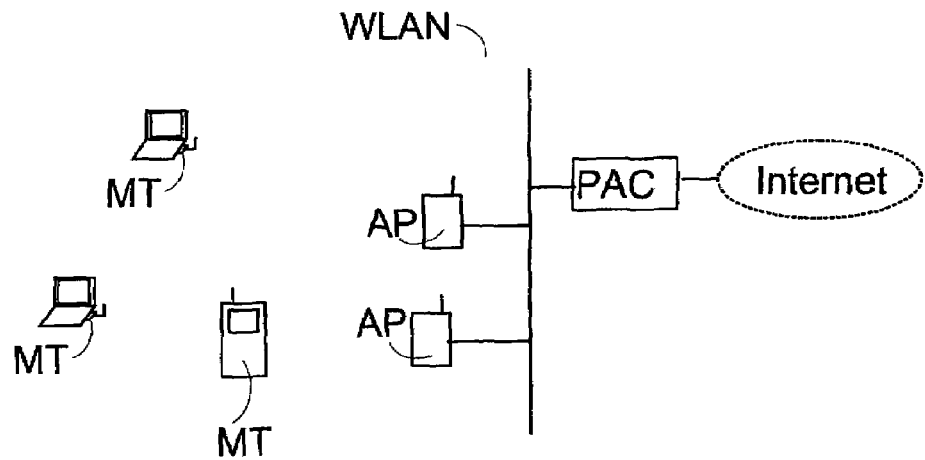
FIG. 1 shows a block diagram of typical elements of the WLAN system.

FIG. 1 shows a telecommunications system according to a preferred embodiment of the invention. The system comprises a terminal device MT and a WLAN network WLAN according to any version of the IEEE802.11 standard. However, the invention can also be applied to other kinds of networks: the wireless local area network may be, for instance, a network according to BRAN (Broadband Radio Access Network) standards. The BRAN standards comprise the HIPERLAN (High Performance Radio Local Area Network) of types 1 and 2, HIPERACCESS and HIPERLINK standards.

The operator of the network WLAN, i.e. WISP (Wireless Internet Service Provider) provides wireless, typically IP-based services in such a way that the terminals MT can move in different, typically highly loaded hotspots, such as in hotels, airports etc. The WLAN network WLAN comprises WLAN access points AP, which provide wireless connection for several terminals MT. The IEEE 802.11 standard determines both the physical layer and the MAC layer protocols for data transmission over the radio interface. Data transmission can utilize infrared or two spread-spectrum techniques (Direct Sequence Spread Spectrum DSSS, Frequency Hopped Spread Spectrum FHSS). Both spread-spectrum techniques use a band of about 2.4 gigahertz. In accordance with the IEEE 802,11 standard, the MAC layer uses what is called a CSMA/CA (Carrier Sense Multiple Access with Collision Avoidance) technique. The access point AP can provide the terminals MT with point control function PCF, whereby the access point functions as the master device and the terminal MT as a slave device.

The terminal MT comprises at least memory, a transceiver for arranging wireless data communications, and a central processing unit CPU comprising one or more processors. The memory comprises a non-volatile part for storing applications controlling the central processing unit CPU and other data to be stored, and a non-volatile part to be used for processing temporary data. Computer program codes executed in the central processing unit CPU can cause the terminal MT to implement inventive means, some embodiments of which are illustrated in FIGS. 2, 3, 4, 5, 6 and 7. Hardware solutions or a combination of hardware and software solutions may also be used to implement the inventive means. The MT may be, for instance, a WLAN card which is connected to a laptop computer, or it may be an integrated device comprising the WLAN and PDA functionalities. The MT may also comprise functionality for utilizing services of the PLMN network, such as the GSM or UMTS (Universal Mobile Telecommunications System) networks, directly via the base station of the PLMN network or via the WLAN network.

The WLAN terminals MT may form an Ad hoc network, which is called an IBSS (Independent Service Set) network, simply by forming a connection to another mobile terminal MT. Terminal communication functioning under the control of one entity, such as the access point AP, forms a BSS (Basic Service Set) network. Infrastructure networks are formed by setting up connections to other networks and services via access points AP. In this way, the access points AP provide what is called an extended service set (ESS). The access points AP at least control reception of data, buffering and transmission between the terminal MT and the network WLAN. Access points AP may form sub-networks. A logical WLAN network may, in turn, comprise one or more sub-networks. In an ESS network, the following types of services may be supported at access points AP: authentication service and deauthentication service, data delivery, data encryption, services relating to accociation, distribution between different access points, and integration.

The WLAN network WLAN can also provide a connection to other networks, such as the Internet, via a gateway. The connection from the network WLAN to other networks can be arranged via a public access controller PAC, which can also be called a portal. In accordance with one embodiment, it allocates an IP address to the terminal MT and performs authentication of the terminal MT. The PAC may also form charging information on the basis of the data to be transmitted and transfer it to a billing server in accordance with an AAA (Authentication, Authorization and Accounting) protocol, for example.

In accordance with an alternative embodiment, the whole or part of the functionality of the PAC can be implemented at the access point AP. The AP supporting authentication in accordance with the IEEE 802.1x standard and network access control, for example, typically uses the AAA protocol.

Figure 2:
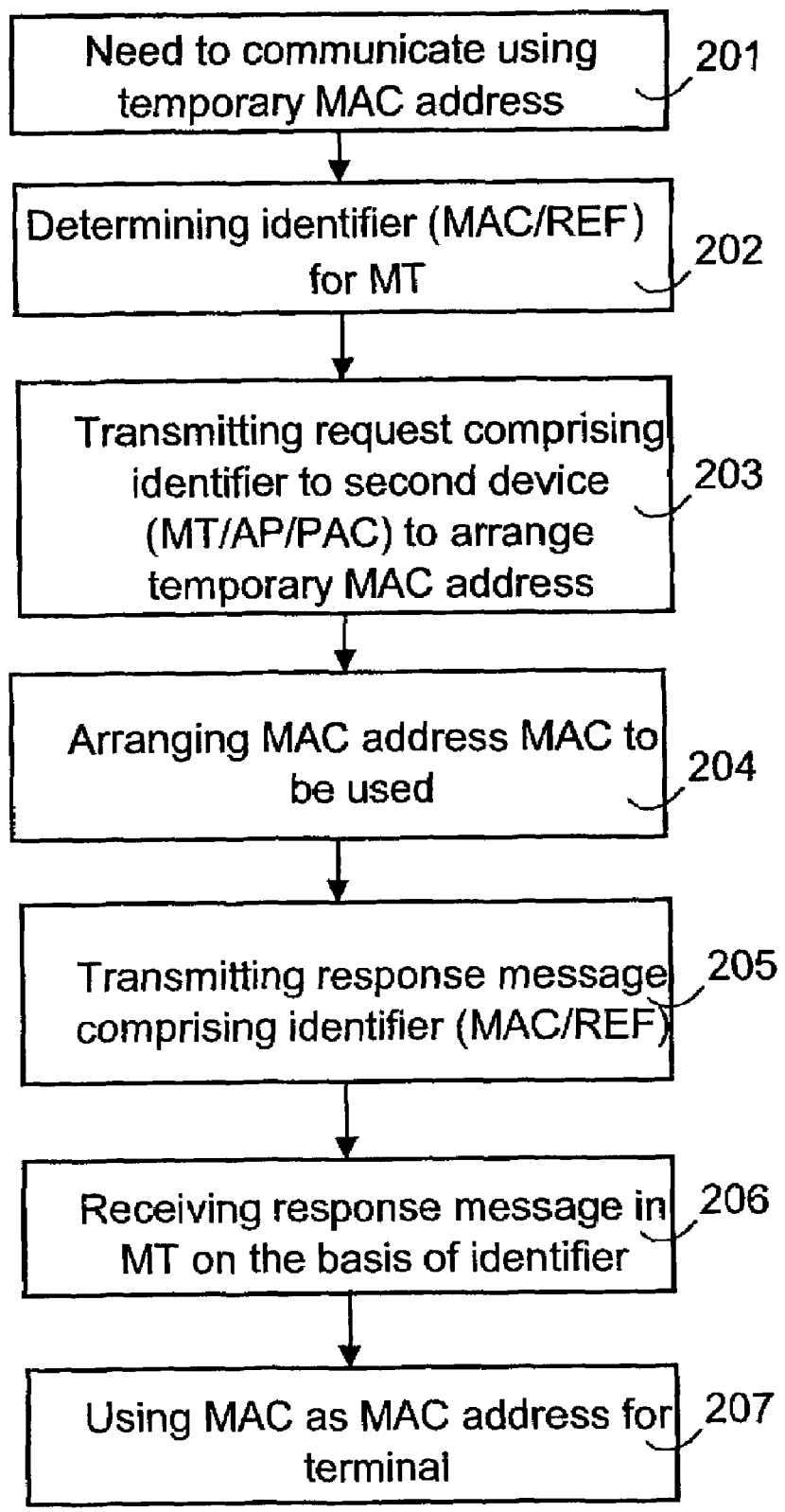
FIG. 2 shows a flowchart of a method according to a preferred embodiment.

FIG. 2 illustrates the present method in a general manner. When the terminal MT has a need 201 to communicate by using a temporary MAC address, the MT determines 202 an identifier to be used to identify the MT at least during the arrangement of the MAC address. This need may arise if the user wishes to remain anonymous, in which case it is not desirable to use the fixed MAC address permanently allocated to the MT at the manufacturing stage. It may also be the case that no fixed MAC address has been allocated to the MT, whereby, instead of using a fixed MAC address, the method according to FIG. 2 is performed each time when setting up a data transmission connection from the MT to another terminal or an access point AP.

An MT transmits 203 a request comprising the identifier it has determined to a second device to arrange a temporary MAC address. The second device may be a second terminal MT, an access point AP or a public access controller PAC, depending on the configuration of the system and on whether it is desirable to set up the data transmission connection to an AP or an MT. On the basis of the request, a temporary MAC address MAC can be arranged 205 in the second device to be used 204, in other words possibly allocate it or check the uniqueness of the received MAC, and also other functions required for data transmission in IBSS, BSS or ESS networks can be arranged. The second device transmits 205 a response message relating to the arrangement of the MAC address comprising an identifier (MAC/REF). The MT identifies 206 on the basis of the identifier that the response message is intended for it. On the basis of the response message, if the MAC address has been successfully allocated, the terminal MT can start using 207 the MAC address allocated to it. In accordance with a first embodiment of the invention described in more detail with reference to FIG. 3, the identifier determined by the MT is a temporary MAC address MAC suggested by the MT, which address may be accepted or rejected by the second device (AP or PAC) after the second device has checked whether the suggested MAC address is unique or not. In accordance with a second embodiment described in more detail with reference to FIG. 4, the second device allocates a temporary MAC address MAC on the basis of the request 203. In such a case, the identifier mentioned in step 202 is a particular reference identifier REF, which is only used to request 203 for allocation of a MAC address and to respond to it in order for the MT being able to recognize that the response message 205 is intended for it. The identifier REF can be added to extension fields presently in use, owing to which standards only need to be modified as little as possible.

The solution illustrated in FIG. 2 allows temporary MAC addresses to be arranged reliably and the user to be provided with anonymity, and thus, following and disturbing the user is at least made significantly difficult.

Figure 3:
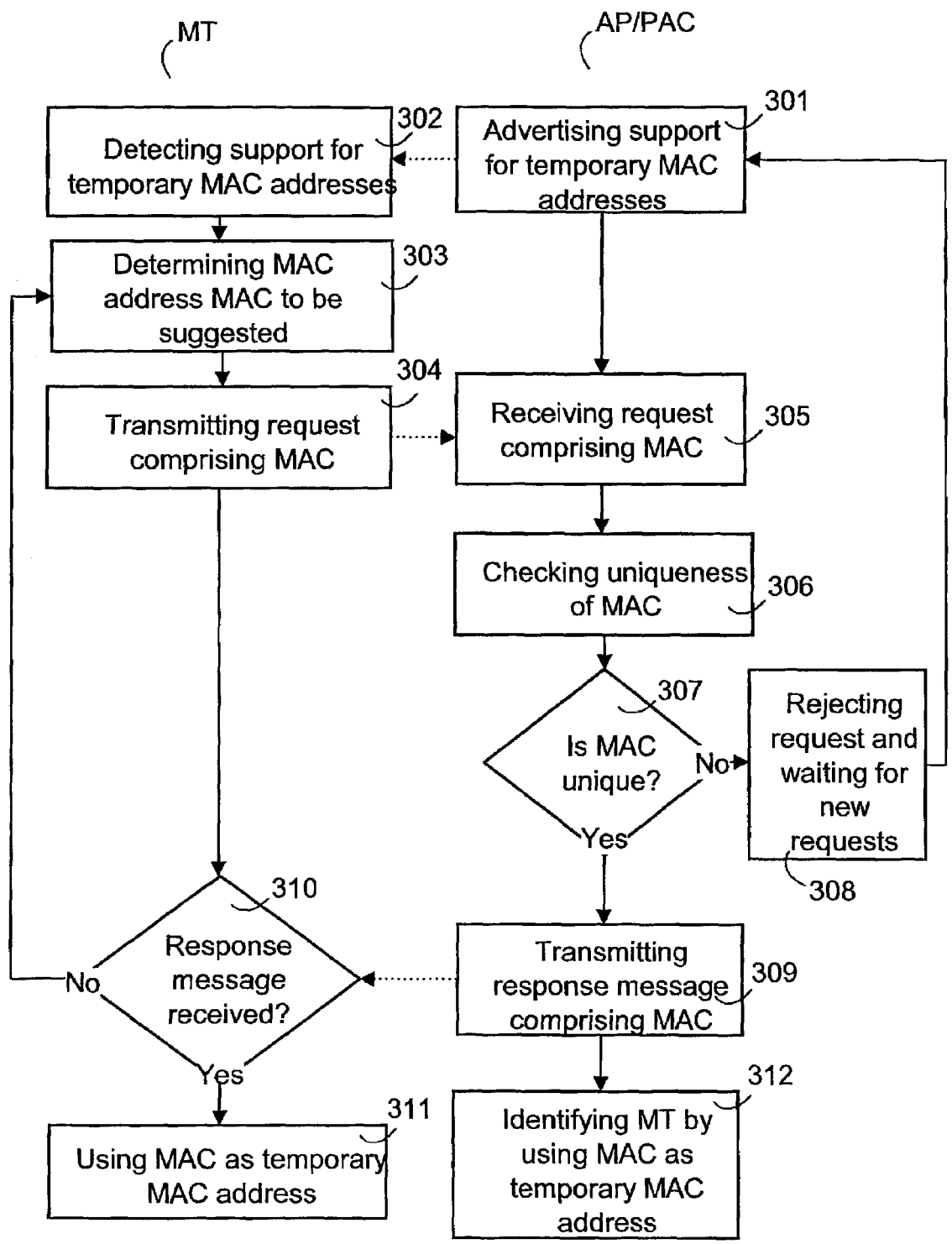
FIG. 3 shows a flowchart of a method according to a first embodiment.

FIG. 3 illustrates a flowchart of the functionality in terminal MT and second device communicating with it, i.e. an access point AP or a public access controller PAC, in a first embodiment, in which the MT itself selects the MAC address.

When there is a need to communicate with the access point AP (to join a BSS network or an ESS network), an MT according to the IEEE 802.11 standard can find the available access points AP either with active or passive scanning. In passive scanning, the MT selects the access point AP to be used on the basis of Beacon messages received from the access point AP. In active scanning, the terminal MT transmits a Probe request. In this request, a well-known MAC address reserved for anonymous terminals, preferably a multicast address, is used as the source address of the MAC layer of the MT, because the MAC address fixedly allocated to the MT is not to be revealed (or does not exist). The access points AP respond to this with Probe responses, which are not acknowledged (because the address of the Probe request has been shared). The terminal MT selects the access point to be used on the basis of the received Probe responses. The access points can thus advertise 301 in Beacon messages and Probe responses that they support the use of temporary MAC addresses, whereby the MT can use the present method. When the terminal MT detects 302 that the AP supports the use of temporary MAC addresses, it determines 303 the MAC address MAC to be suggested.

MAC can be a random number generated by means of a random number generator. MAC can be selected from the address space allocated to the MT on the basis of an address selection algorithm. A temporary MAC address MAC can be allocated to the MT for instance from among organization-specific unique identifiers (OUI) reserved for this purpose. Typically, one OUI allows 2^24 addresses. The IEEE 802 MAC address format allows locally administrable MAC addresses, in which there are 46 available bits in a 48-bit address format for selecting the temporary MAC address. A MAC address can also be formed of a network identifier, such as a BSS identifier BSSID, and of a random part added thereto, for example.

The MT transmits 304 to the access point AP a request comprising the MAC address MAC to be suggested as the MAC layer source address. Communication between the MT and the AP is indicated with a broken line. The request may be an authentication request defined in IEEE802.11 specifications, or an association request according to IEEE 802.11i-specifications. If a new address is concerned (which the MT has not used previously), the MT indicates in the request, in accordance with a preferred embodiment, that a new address is concerned. This can be implemented for example as one new address bit in the request or by adding to the request an information element indicating the new address.

The access point AP receives a request 305, determines the MAC which is the source address of the request and checks 306 the uniqueness of the MAC address MAC to be suggested in this way. The MAC address must be unique within the WLAN network, i.e. within the ESS. The checking 306 may be decentralized, in other words the access point AP utilizes some other service or network element to check the uniqueness. The checking 306 can be performed for example by using the IAPP protocol (Inter Access Point Protocol). The access points AP belonging to the WLAN network may for instance have a common database in which a list is maintained on temporary MAC addresses MAC and on the basis of which the uniqueness of the MAC address MAC to be suggested can be checked. The control of temporary MAC addresses may be centralized for instance in a public access controller PAC. The following presents a few examples of how the checking of the uniqueness of the MAC address 306 can be performed:

1. At first, the AP checks whether the address MAC suggested by the terminal MT is in use in terminals MT associated to this AP. If it is in use, the MAC is not unique and there is no need to continue the checking.

2. AP transmits a message to a centralized server keeping a record of temporary addresses. The message comprises the address MAC suggested by the terminal MT. The server can be implemented for instance at an access point AP, in a public access controller PAC or in another device.

3. The server responds either that the address MAC is available or that the address is reserved.

A second example:

1. The AP checks at first, as in the preceding example, whether the address MAC is in use in terminals MT associated to this AP.

2. The AP transmits a challenge message to the address suggested by the terminal to the wired network side (unicast packet).

3. If the address is reserved, the original holder of the address responds with a response message indicating this. On behalf of the holder of the address, also the present AP of the address holder may generate the response message. The requesting AP concludes from the response message that the address is in use.

4. If no response arrives, the AP may retransmit the message several times.

5. If no response arrives within a predetermined time, the AP determines the address MAC to be available.

Yet a third example:

1. The AP checks at first whether the address MAC is in use in terminals associated to this AP, as in the preceding examples.

2. The AP transmits a message to the fixed network to a multicast address or broadcast address. The message comprises an address MAC suggested by the terminal MT. All APs of the network process the packets transmitted to this address.

3. When the other APs receive the request packet, they check whether the address in question is in use in their terminals MT. If it is, the AP transmits a response message indicating this to the requesting AP.

4. If the requesting AP does not receive a response, it repeats the request a couple of times until determining within a predetermined time that the address MAC is available.

It may be the case that the uniqueness is at first checked only at the access point AP for the duration of the authentication, and only later concerning the rest of the network.

If, on the basis of checking 306, 307, the MAC address is not unique, the access point AP rejects 308 the request and begins to wait for new requests. If, on the basis of the checking, the suggested MAC address is unique, the access point AP transmits 309 a response to the terminal MT, the destination address of which is MAC, and which indicates that the checking of the uniqueness was successful. This response may be an authentication response or an association response in a system according to IEEE 802.11. Thus, the access point AP can identify 312 the terminal MT by using the identifier MAC as a temporary MAC address. The temporary MAC address is preferably valid during the WLAN session. The same MAC address is preferably valid in the area of the network even if the terminal MT moved over to another access point AP. If a list of the reserved MAC addresses MAC is maintained in the network, the reservation must be removed when the WLAN session has been terminated, in other words when the terminal MT has moved away from the WLAN network. Alternatively, the same address can be used in later WLAN sessions in the same WLAN network.

The MT observes 310 preferably during a predetermined time whether the response message comprising the identifier MAC as the destination address of the MAC layer is received from the access point AP. If, within the predetermined time, the response message is not received, the MT preferably reattempts with a new MAC address suggested and thus returns to step 303. If it receives the response message indicating successful uniqueness from the access point AP, the MT configures the data transmission means of the MAC layer to use 311 the identifier MAC it has determined as the temporary MAC address. Thus, the MT adds to the outgoing packets (MAC PDU) the MAC as the MAC layer source address and selects the packets comprising the identifier MAC as the MAC layer destination address to be delivered to upper layers. Preferably, the use of a temporary MAC address MAC does not, after the arrangement of the address, differ in any way from the use of a fixed MAC address permanently allocated by the manufacturer. The temporary MAC address can thus be used instead of a fixed address in all protocol messages. For instance, handover to another access point AP can be performed in the same way as when a fixed MAC address is used. In networks according to the IEEE 802.11 standard, the terminal MT moves over to another access point AP by transmitting a reassociation request to the new access point AP. When the terminal using a temporary MAC address moves over to another access point AP, the terminal MT is identified on the basis of the temporary MAC address in the same way as the terminal using a fixed MAC address is identified on the basis of the fixed MAC address in all messages relating to this event, such as in reassociation messages (reassociation request, reassociation response) and in IAPP messages between the access points.

Deviating from FIG. 3, it is alternatively possible for the access point AP to transmit a response in step 308 to a multicast address, for example, which indicates the error. It is not advisable to transmit the error message to the MAC address MAC suggested by the terminal MT. The reason is the acknowledgments of the MAC layer: If the address MAC is already reserved, both the new terminal and the original holder would receive the error message. Both of these would acknowledge the packet as received by means of an acknowledgement message of the MAC layer. The acknowledgement message must be transmitted at a certain point of time, whereby these two acknowledgment messages would collide. Instead of the access point AP, the public access controller PAC can perform steps 301, 305 to 309 and 312.

Also in the embodiment of FIG. 3, a particular reference identifier REF may be utilized. When the reference identifier REF is used in the request 304, the access point AP may utilize the reference REF when the uniqueness of the MAC, address is checked 306. Hereby, the following rules can be followed: If the MAC address MAC is already in use with a different identifier REF, there has been an address collision and the MAC address MAC is not unique. If the MAC address MAC to be suggested is not in use, it is unique irrespective of how the MAC address MAC is suggested. If the MAC address MAC is already in use with the same identifier REF and the terminal MT has not in the association request requested for a new MAC address, the terminal MT has taken the MAC address MAC in question into use previously, so that it is unique. If, however, the terminal MT has indicated that it requires a new MAC address, there has been a collision and the MAC address MAC suggested is not unique.

The reference identifier REF may be, for instance, a random number or a time stamp. In the embodiment of FIG. 3, the risk of collision is further reduced by the use of the reference identifier REF, because it is highly improbable that two terminals MT would at substantially the same point of time determine the same MAC address MAC suggested and even the same reference identifier REF. It is to be noted that examples of determination and checking of identifiers REF and MAC illustrated in more detail with reference to FIG. 3 can also be applied to other embodiments, for example to the embodiments shown in FIGS. 4 and 5.

Figure 4:
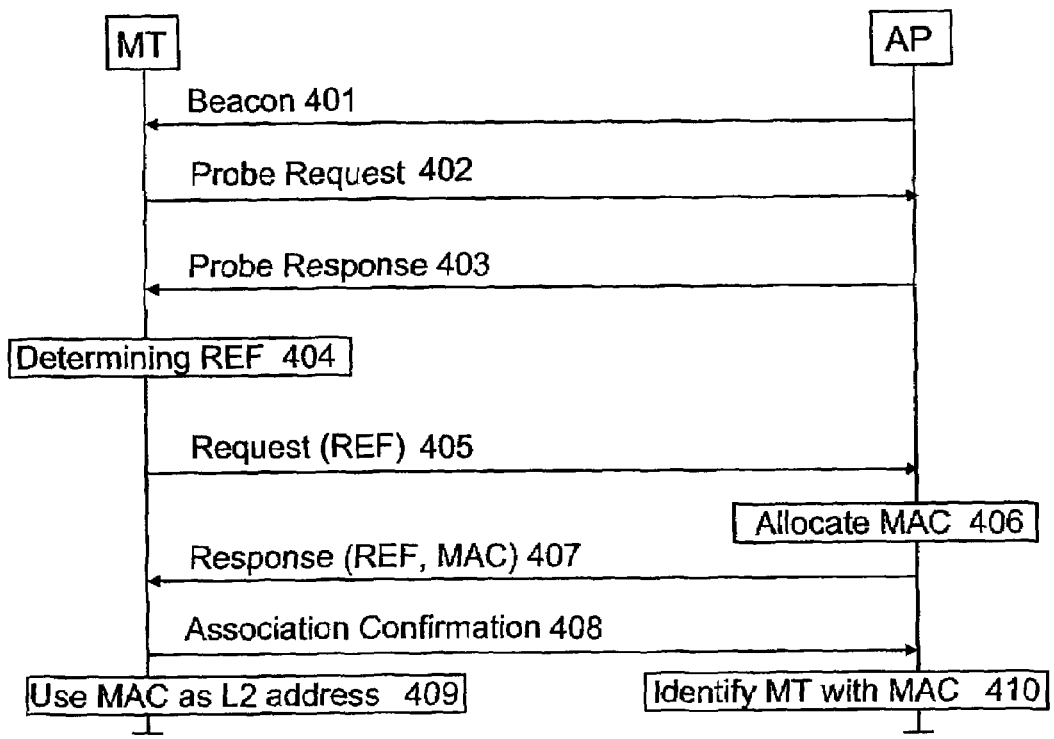
FIG. 4 shows a signalling diagram of a method according to a second embodiment.

FIG. 4 illustrates a second embodiment, in which a network, preferably an access point AP, determines the temporary MAC address MAC. Also in this embodiment, the terminal MT can use both active and passive scanning to find a suitable access point AP. In passive scanning, the AP transmits 401 Beacon messages in which support is preferably indicated to temporary MAC addresses. On the basis of the received Beacon messages, the MT selects the access point AP to be used from the access points AP. In active scanning, the terminal MT transmits 402 a Probe message to the access points AP. In this request, a well-known source MAC address, preferably a multicast address, is used. The access points AP respond 403 to this with a Probe response, which is not acknowledged. Preferably, the Probe response indicates support to temporary MAC addresses. The terminal MT selects the access point on the basis of the received Probe responses. When the terminal MT detects that the AP supports the use of temporary MAC addresses, it determines 404 (Determining REF) the reference identifier REF. When the MT is arranged to select 404 the reference identifier REF in such a way that it is with high probability unique, the risk of collision can be reduced to be sufficiently small.

After this, the terminal MT transmits 405 a request comprising the identifier REF by using a generally known MAC address (possibly the same as in the message 402), which is reserved for anonymous terminals. The request may be an authentication request, or an association request according to the IEEE 802.11i specifications. On the basis of the request, the access point AP allocates 406 (Allocate MAC) a temporary MAC address MAC, which is unique at least within the ESS network. The access point AP may for instance have a pool of temporary addresses available, the addresses being applicable to this purpose. Thus, by allocating different address spaces to different access points AP of the ESS it can be ensured that the different access points do not allocate the same MAC address MAC. In a server of the network, for example in the public access controller PAC, a list can be maintained to which the temporary MAC addresses allocated by the different access points AP are added. Thus, the AP can transmit a request for allocation of a temporary address MAC. On the basis of the request, the server selects an available address and transmits a response message comprising the allocated address MAC. The AP may also select the address MAC randomly and utilize one of the examples described in connection with step 306 of FIG. 3 to ensure the uniqueness of the MAC.

The access point AP includes the new MAC address and the reference identifier REF in the response 407 to be transmitted to the MT (association response or authentication response), the destination address being the source address of the message 405, i.e. the address shared by anonymous terminals, for example a multicast address. The response 407 is transmitted to a well-known address, preferably to a multicast address, the MT being arranged to observe this address after the transmission of the request 405. The terminal MT identifies on the basis of the identifier REF included in the response that the association message is intended for it. After this, the terminal MT picks up the MAC address MAC allocated by the AP and can configure the data transmission means of the MAC layer to use 409 (Use MAC as L2 address) the new MAC address MAC allocated by the access point AP. Thus, MAC is added to the outgoing packets on the MAC layer as the source address, and the packets having MAC as the destination address are selected to be transmitted to upper layers. Preferably, the terminal MT further acknowledges 408 receipt of the new address with the association confirmation message. On the basis of the acknowledgement, the AP can identify 410 (Identify MT with MAC) the MT by using the temporary MAC address MAC.

In principle, it is possible that two terminals MT transmit a request 304 or 405 simultaneously to the same access point AP by using the same suggested MAC address MAC and/or reference identifier REF. Both terminals process the response 309, 407 due to the same identifier MAC/REF. Thus, both terminals MT assume that they have a valid temporary MAC address MAC. The access point AP can, however, detect the problem when it receives the second response and forces the terminals MT to request for new MAC addresses (typically to associate again). When the MACs/REFs are sufficiently long and their selection is arranged in the MT for example with a good random number generator, the risk of collision can be can be made very small.

When temporary MAC addresses are used, it is possible that the same MAC addresses are used in different ESSs. The uniqueness of the MAC addresses can be guaranteed only within the ESS, where the IAPP protocol, for example, can be used between the access points. Thus, the uniqueness of the MAC addresses between different ESSs cannot be guaranteed, because the access points AP are not logically connected to each other. Each data and management frame contains a BSSID identifier indicating the access point AP under which the frames in question are transferred. In accordance with an embodiment, when a frame is received, the destination address and the BSSID identifier are checked in address checking before the frame is accepted and an acknowledgement frame is transmitted. This allows the same MAC addresses to be used in different ESSs by checking the BSSID identifier in all the frames where it is usable. Only the frames having the correct BSSID identifier are accepted and acknowledged. The access point AP must in such a case have a globally unique MAC address and thus also a globally unique BSSID identifier. Some control frames, such as acknowledgement messages ACK, do not, however contain a BSSID field. Thus, there is a theoretical risk of a collision, but in practice, the probability is extremely low, because the collision of acknowledgements would require a collision of addresses between the ESS, simultaneousness and topology which might suffer from a hidden node problem. If, however, such an error case occurred, the result would be loss of the frames, which would, in most cases, be corrected by upper layer protocols. RTS-CTS (Request to Send—Clear to Send) handshaking can be used to alleviate the problem caused by hidden nodes. In temporary MAC addresses, it is also possible to reserve a portion for a network identifier, in which case different network identifiers would be used in different ESSs. In this way, the temporary MAC addresses in adjacent ESSs would be unique provided that the ESS used different network identifiers. Thus, it would not be necessary to check the BSSD identifier either. One option is also to include the BSSID identifier in acknowledgement messages ACK.

When the MT moves over to a new WLAN network (new ESS), it must reserve a new MAC address in the new network if it wishes to have anonymous service. Temporary MAC addresses can be returned to the address pool if they have not been used within a predetermined time. If centralized address control or certain address spaces are used, the temporary address must at some stage be indicated to be available (in checking solutions performed by the holder of the address or his representative, returning is not needed). For instance, the address can be released when it has not been used within an adjustable time, which may be calculated from, for example, the deassociation. In accordance with an embodiment, the terminal MT must request for reconfirmation of the temporary MAC address MAC (indicate in request 304, 405 that it is not a new MAC address) if the address has not been used for a long time. In this way, it can be ensured that the MAC address MAC in question has not been allocated to any other terminal MT. In accordance with another embodiment, a validity time can be determined for a temporary MAC address as early as at the allocation or uniqueness checking stage, the MAC being released when the validity time has expired (if the MT has not requested for an extension).

Figure 5:
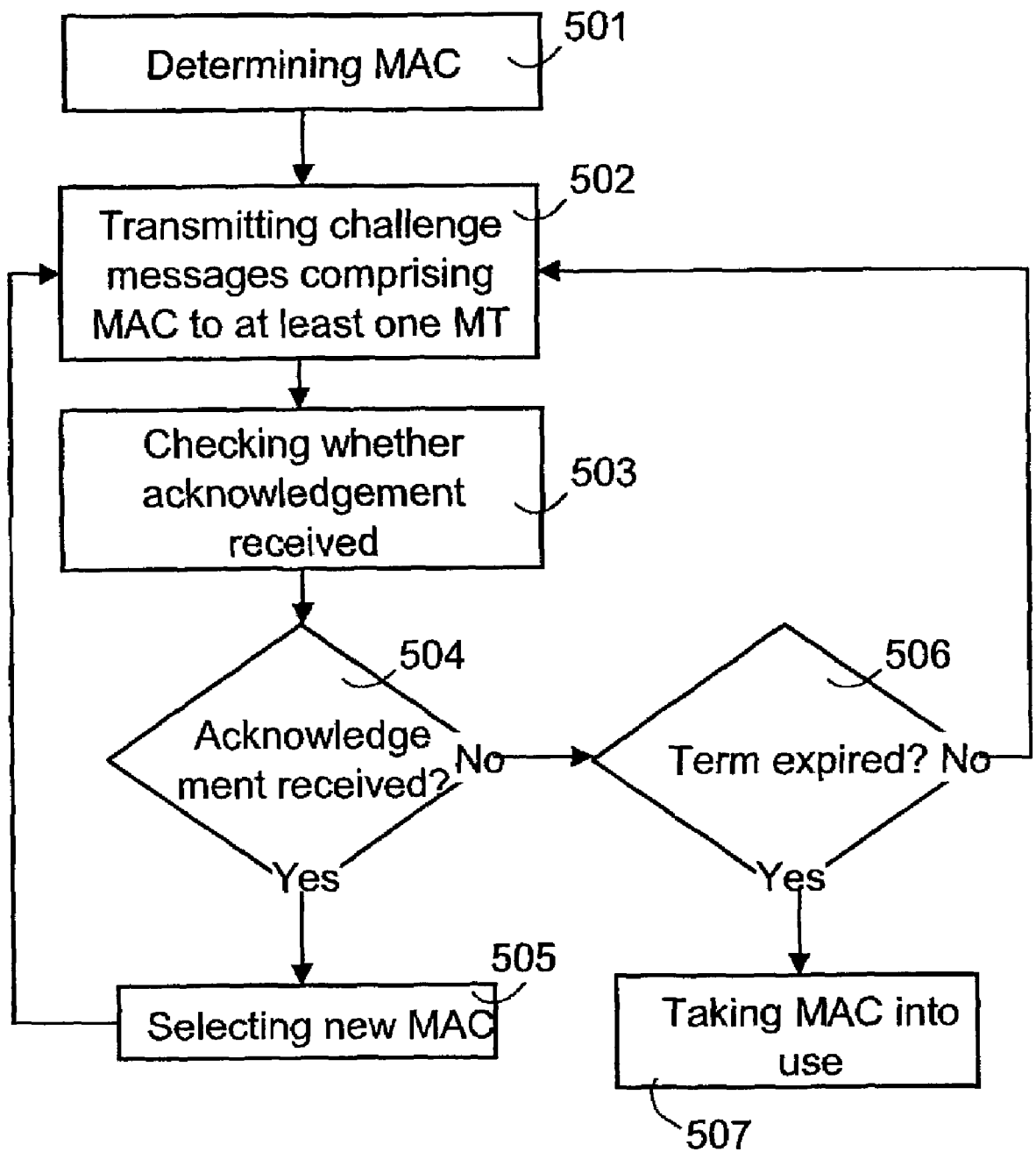
FIG. 5 shows a flowchart of the operation of a terminal device according to a third embodiment.

FIG. 5 further illustrates a third embodiment, in which temporary MAC addresses are arranged between two (or more) terminals MT. Having determined 501 the temporary MAC address MAC in the way described in connection with FIG. 3, for example, the MT transmits 502 to one or more other terminals a challenge message relating to the acquisition of the MAC address and comprising the MAC address MAC to be suggested. Preferably, MAC is the MAC layer address of the challenge message, and a well-known multicast address is the source address. The challenge message comprising the MAC can alternatively be transmitted to a multicast address. The MT observes 503 whether an acknowledgement of the challenge message is received. If the address MAC in question is used by some other terminal MT, the terminal receives a message and is arranged to respond to and acknowledge it for example with an ACK message, which is shown in more detail in FIG. 6. If this acknowledgement relating to the acquisition of the MAC address is received, MAC is not unique, and the MT selects 505 a new identifier MAC and makes another attempt. If no acknowledgement has arrived, the MT checks whether the predetermined term has expired. If the term has expired, the MAC can be interpreted to be unique and the MT can start communication 507 with one or more terminals MT by using the identifier MAC it has allocated as its MAC address. If the term has not expired, the MT preferably returns to step 502 and retransmits the challenge message. Deviating from FIG. 5, the MT can also return to step 503 to check whether an acknowledgement of the transmitted challenge message has arrived. Thus, also an ad hoc network (IBSS) can be formed by using temporary MAC addresses.

Figure 6:
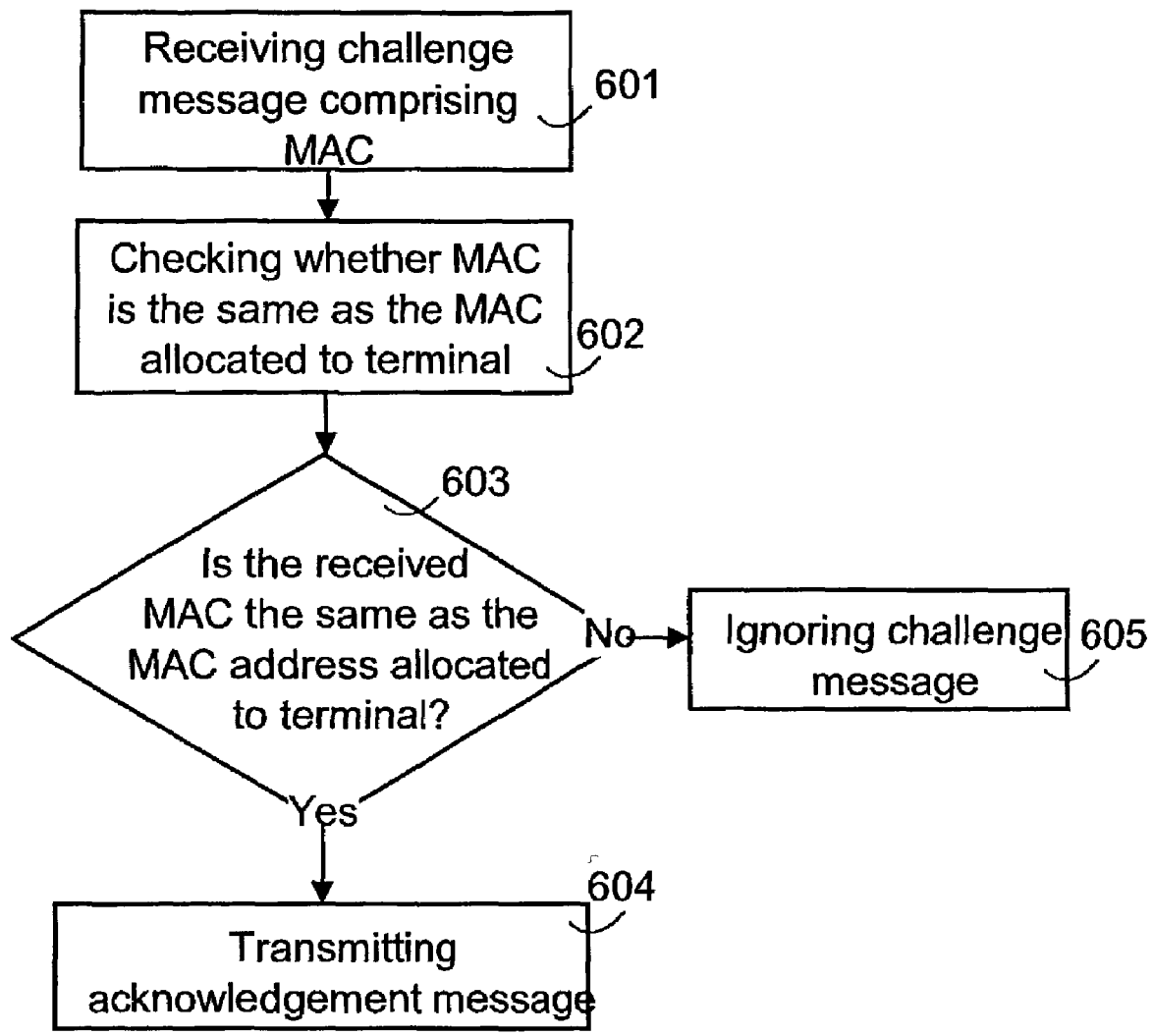
FIG. 6 shows a flowchart of the operation of a terminal device responding to challenge messages.

FIG. 6 further illustrates operation of the terminal MT according to a third embodiment in greater detail when it receives the temporary MAC address MAC of the challenge message from the device checking the uniqueness. The terminal MT is arranged to receive 601 challenge messages comprising a temporary MAC address to be suggested from another device, either from a terminal or an access point AP. This reception can take place when the temporary MAC address of the terminal MT is the MAC that is the destination address of the challenge message (whereby the response to steps 602, 603 is received directly), or when the MT receives a challenge message addressed to a broadcast address. The terminal MT checks 602, 603 whether the temporary MAC address MAC suggested in the challenge message is the same as the MAC address temporarily allocated to the terminal MT. If the suggested MAC address MAC is the same as the MAC address temporarily allocated to the terminal MT, the MT is arranged to transmit 604 a response message to another device. This response message may be a conventional acknowledgement message indicating reception of the challenge message, or it may be a special response message to indicate that the temporary MAC address is not unique. If the MAC is different from the MT 3 s own MAC address, the MT can ignore 605 the challenge message, in which case unnecessary message traffic is avoided.

Figure 7:
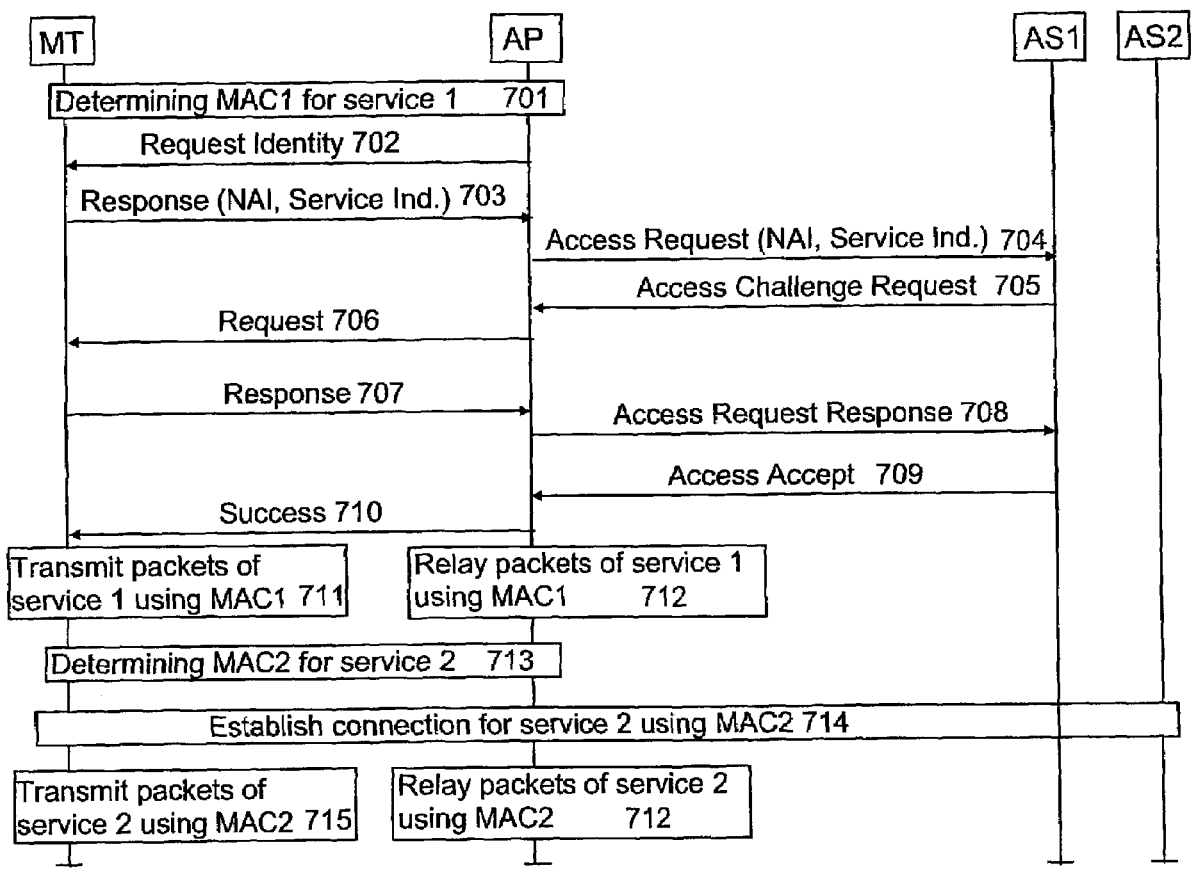
FIG. 7 illustrates the usage of WLAN services utilizing temporary MAC addresses.

FIG. 7 illustrates further the usage of WLAN services using temporary MAC addresses according to a preferred embodiment of the invention. In the embodiment of FIG. 7 the Extensible Authentication Protocol (EAP) and the access control protocol called "Remote Authentication Dial-In User Service" (RADIUS) is used, however, any protocol resulting in corresponding functionality may be used, e.g. Diameter, which is a protocol developed from the RADIUS protocol, or any future Authentication Authorization Accounting protocol (AAA-protocol).

A temporary MAC address MAC 1 is determined 701 for MT. In step 701 the MAC 1 is allocated (by MT or AP) and the uniqueness of MAC 1 is checked preferably by AP. Step 701 can be implemented using any one of the embodiments described above in connection with FIGS. 2-6. Preferably, the MAC 1 is associated with a service the user is willing to use. In this context service is determined by certain network environment that the WLAN terminal MT will be connected to for providing certain service for the terminal MT. For instance, the environment may be a local network, a private network, the Internet, virtual local area network, a specific service provider network, etc. The user can be provided with a list of possible services, for instance "MMS (Multimedia Messaging Service)" and "Internet". The terminal MT comprises means to receive a service selection indicator or a reference to a service selection indicator from the user interface of MT. This selection of service may be done already before allocating the temporary MAC address MAC 1 and therefore step 701 may be performed as a response to selection of a service.

MT also comprises means to establish a service request to be sent to an authentication server AS1, the service request including a NAI (Network Access Identifier) which further includes indication of service. The authentication server AS1 is a device or a system for authorizing access to a service. For instance, AS1 may be PAC or a device arranged to authenticate WLAN terminals e.g. in cellular GSM or UMTS network. In one embodiment the NAI may look like <username>@<realm>. The <username> is the identity of the user and/or the WLAN terminal MT and the <realm> is the identity of the authentication server AS1 that is to handle the service request from the terminal MT. Such NAI may, for example, look like name@serviceprovider.com. The service selection indicator may be inserted anywhere in the NAI. In one embodiment the service selection indicator is inserted between the "@" and the <realm>, i.e. <username>@<service selection indicator><realm>, but the service selection indicator may be inserted anywhere in the NAI.

Referring to the example in FIG. 7, the WLAN access point AP requests the identity of the user/WLAN terminal. For this purpose the access point AP sends an EAP-Request/Identity packet, 702, to the WLAN terminal. The WLAN terminal responds with an EAP-Response/Identity packet 703, which includes the NAI including the service selector indicator of service (service 1) the user has selected. The determined temporary MAC address MAC 1 is used to deliver these messages.

The WLAN access point AP then sends a RADIUS Access-Request packet 704 including the NAI including the service selector indicator to the authentication server AS1. When the authentication server AS1 has received the RADIUS Access Request packet 704 it checks whether the terminal and/or the user is authorized to connect to the requested service or not. If the user/terminal MT is not authorized, then the authentication server refuses the connection attempt.

However, if the user/terminal is authorized, then the authentication server sends a RADIUS Access-Challenge packet 705, including an EAP-request, to the WLAN Access point AP. When the RADIUS Challenge-Challenge packet 705 is received at the WLAN Access point AP, the WLAN Access point AP sends an EAP-request packet 706, including the above mentioned EAP-request, to the WLAN terminal MT. The WLAN terminal MT responds to this packet 706 by sending an EAP-response packet 707 to the WLAN access point AP, which then sends a RADIUS Access-Request packet 708, including the EAP-response, to the authentication server AS1. The procedure of sending packets 705, 706, 707 and 708 may be repeated N number of times. The value of N varies depending on the authentication method used. The authentication is completed either as a failure, if the WLAN terminal and/or user failed the authentication process, or as a success, if the WLAN terminal MT was successfully authenticated. If the authentication is a failure the authentication server AS1 sends a failure packet to the WLAN terminal MT via the WLAN access point AP.

If the authentication is a success, the authentication server AS1 retrieves the network attributes needed for providing a connection in accordance with the service (service 1) that was requested by means of the service selector indicator. For example, the network attributes may be tunnel attributes for a Virtual LAN identifier, which directs the data packets of the WLAN terminal MT to a specific Virtual LAN. Then the authentication server AS1 sends a RADIUS Access-Accept packet 709, including the network attributes for the requested service, to the WLAN access point AP. The WLAN access point AP then provides the WLAN terminal with an EAP-Success packet 710, and now the LAN terminal MT has access to the requested service (service 1). After this, the terminal MT transmits 711 packets belonging to service 1 (typically from certain application) using MAC 1 as source MAC address. For received packets, the MT delivers the packets to upper layers according to the target MAC address field in the packet, i.e. delivers the packets to a service process handling service in MT associated with the address MAC 1. For instance, packets are directed to an application on the basis of a port number associated with the temporary MAC address MAC 1. The access point AP uses 712 the received network attributes (associated with the MAC 1 and thereby mapping the network parameters to data flow to/from MAC 1) when relaying packets to/from MAC address MAC 1. Thus a tunnel or a context defined by MAC 1 is established as the temporary MAC address MAC 1 is associated with service process of service 1 in terminal MT and with the received network parameters in access point AP. The context binding the MAC address and the service process represents a logical network interface in MT.

By making services selectable for a user and by utilizing an AAA-protocol, e.g. RADIUS, a service provider may easily create, provide and log billable services and a user may get access to an increasing number of services. For example, it is possible to generate a log of every user and the services the user has utilized. An indicator of the selected service and the identity of the user is sent to the access server by means of the NAI and is thus easily registered in the log. Additional, a billable feature is measured and registered in the log, such billable feature may be a time interval during which the service has been used, an amount of data transferred to, from or both to and from the WLAN terminal, the number of times the service has been used, etc. The log may then be used by the service provider for billing the user.

If the user desires to activate another service, service 2, a second tunnel or context may be established for service 2 using a second temporary MAC address. Thus, preferably after a service selection is received from user interface, the second temporary MAC address MAC 2 is determined 713 between MT and AP to be used for transmission of packets associated with service 2. Connection may be established 714 for service 2 using the MAC 2. The access point is not able to map MAC 2 to the first temporary MAC address MAC 1 which the same terminal MT is using. From access network

3 s point of view this is a new terminal. Thus this embodiment does not necessitate any modifications in WLAN access network. Preferably the phase 714 includes similar authentication procedure as illustrated for service 1 in messages 702-710. However, the second temporary MAC address MAC 2 and the service selector indicator of service 2 are used and thus typically also the authentication server is different (AS2) than for service 1. If the use of service 2 is authorized by the second authentication server AS2, network attributes are sent to the access point AP. MT may thus begin to compose and transmit 715 packets of service process of service 2, associated with the temporary MAC address MAC 2, having MAC 2 as source MAC layer address and deliver received packets to upper layers to the associated service process. AP may start to relay packets to/from MAC 2 using the network attributes received in phase 714 from AS2, i.e. transmission parameters associated with service 2.

This embodiment enables the usage of several MAC addresses at a time. Several services may be used, via the same radio network and access point AP, at the same time which is considerable improvement compared to current situation where only one MAC address and service can be used at a time. Each MAC address determines a temporary or fixed context. Different contexts can be considered as separate logical connections, possibly having different connection parameters such as IP parameters, in the view of WLAN access network and AAA infrastructure. This enables provision of different contexts for different purposes, for instance one context for delay sensitive applications and another context for error sensitive applications. The embodiment also enables different charging/billing instructions for different contexts. The MT comprises means to select a correct activated context and thus correct MAC address, for packets to be transmitted. For instance, data of certain application will be also transmitted using a certain predetermined parameters characterizing the context to be arranged. Each entry in the service list can be activated as a separate context. Also for predetermined contexts temporary MAC addresses may be determined. One context may also be a default context and possibly a fixed MAC address is used for this context.

As an example the first logical network interface or context defined by MAC address MAC 1 is used by multimedia messaging application process and the second logical network interface or context defined by MAC address MAC 2 is used by a WWW browser application process ("Internet" service process).

It will be obvious to a person skilled in the art that with the advance of technology, the basic idea of the invention can be implemented in a plurality of ways. The invention and its embodiments are thus not restricted to the above-described examples but can vary within the claims.

The invention claimed is:

1. A method of transferring messages required for acquiring a temporary MAC address in a wireless local area network, the method comprising:
   determining a temporary MAC address in a first device to identify the first device;
   transmitting a message from the first device to a second device to check uniqueness of said temporary MAC address, the message comprising said temporary MAC address to be suggested as a MAC layer source address;
   in response to the message received from the first device, checking uniqueness of said temporary MAC address by the second device;
   in response to the temporary MAC address not being unique in the wireless local area network, the second device rejects the temporary MAC address determined by the first device;
   in response to the temporary MAC address being unique in the wireless local area network, transmitting a response message relating to acquisition of the MAC address from the second device to the first device, the message comprising said temporary MAC address;
   identifying in the first device on the basis of the temporary MAC address that the response message is intended for the first device; and
   using said temporary MAC address as the MAC layer source address to identify messages transmitted from the first device and as a MAC layer address to receive messages having the temporary MAC address as a destination address for messages addressed to the first device in a wireless local area network.

2. A method according to claim 1, wherein the first device is a wireless terminal device and the second device is an access point of a wireless local area network.

3. A method according to claim 1, wherein said messages are association messages transferred to form association between the first device and the second device, or authentication messages transferred to authenticate the first device.

4. A method according to claim 1, wherein said temporary MAC address is a random number.

5. A method according to claim 1, wherein the message transmitted to the second device is added with indication information on whether a new MAC address is concerned; and the indication information is used when uniqueness of said temporary MAC address is checked.

6. A method according to claim 1, the method further comprising:
  determining, in addition to said temporary MAC address, a second identifier in the first terminal device;
    adding also the second identifier determined by the terminal device to the messages; and
    using the second identifier in checking the uniqueness of said temporary MAC address.

7. A method according to claim 1, the method further comprising:
  associating said temporary MAC address to a service activated for the first device,
  associating network parameters of the service to said temporary MAC address in the second device, and
  using said temporary MAC address to identify packets of the service to/from the first device; and
  transferring the packets identified by said temporary MAC address according to the network parameters associated thereto.

8. A wireless local area network system comprising a first device and a second device, wherein
  the first device is configured to determine a temporary MAC address to identify the first device;
  the first device is configured to transmit a message to the second device to check uniqueness of said temporary MAC address, the message comprising said temporary MAC address to be suggested as a MAC layer source address;
  the second device is configured to check uniqueness of said temporary MAC address in response to receiving the message from the first device;
  the second device is configured to transmit a response message, in response to the message received from the first device, relating to acquisition of the MAC address to the first device the message comprising said temporary MAC address in response to the temporary MAC address being unique in the wireless local area network and configured to reject the temporary MAC address in response to the temporary MAC address not being unique in the wireless local area network;
  the first device is configured to identify on the basis of said temporary MAC address that the response message is intended for the first device; and
  the first device and the second device are configured to use said temporary MAC address as the MAC layer source address to identify messages transmitted from the first device and as a MAC layer address to receive messages having the temporary MAC address as a destination address for messages addressed to the first device in a wireless local area network.

9. A wireless terminal device, wherein the terminal device is configured to communicate with a second device in a wireless local area network, the terminal device is configured to determine a temporary MAC address to identify the terminal device;
  the terminal device is configured to transmit a message to the second device to check uniqueness of said temporary MAC address, the message comprising said temporary MAC address to be suggested as a MAC layer source address;
  the terminal device is configured on the basis of said temporary MAC address to identify a response message transmitted by the second device in response to the message received from the terminal device, to be intended for the terminal device
  the terminal device is configured, as a response to said temporary MAC address being unique in the wireless local area network, to use said temporary MAC address as the MAC layer source address to identify the messages transmitted from the terminal device and as a MAC layer address to receive messages having the temporary MAC address as destination address for messages addressed to it the terminal device in a wireless local area network.

10. A terminal device according to claim 9, wherein the terminal device is configured to associate said temporary MAC address to a service process in the terminal device, whereupon
  the terminal device is configured to add said temporary MAC address as the MAC layer source address to messages of the service process, and
  the terminal device is configured to deliver to the service process in the terminal device the received messages comprising the temporary MAC address as the destination address.

11. A terminal device according to claim 9, wherein the terminal device is further configured as a response to not receiving a response message indicating said temporary MAC address not to be unique in a wireless local area network from the second device, the terminal device is configured to add said temporary MAC address as the source address of the MAC layer to messages to be transmitted, and to receive messages comprising said temporary MAC address as the destination address.

12. A terminal device according to claim 11, wherein the terminal device is configured to associate said temporary MAC address to a service process in the terminal device, whereupon
  the terminal device is configured to add said temporary MAC address as the MAC layer source address to the messages of the service process, and
  the terminal device is configured to deliver to the service process in the terminal device the received messages comprising said temporary MAC address as the destination address.

* * * * *

UNITED STATES PATENT AND TRADEMARK OFFICE
CERTIFICATE OF CORRECTION

PATENT NO. : 7,359,989 B2
APPLICATION NO. : 10/310222
DATED : April 15, 2008
INVENTOR(S) : Orava et al.

It is certified that error appears in the above-identified patent and that said Letters Patent is hereby corrected as shown below:

Col. 11, lines 31-32: "the MT3 s own" should read --the MT's own--.

Col. 13, lines 43-44: "network 3 s point" should read --network's point--.

Claim 1, Col. 14, line 39: "MAC layer" should be --MAC address layer--.

Claim 9, Col. 16, line 22: "as destination" should be --as a destination--.

Claim 9, Col. 16, line 23: "to it the" should be --to the--.

Signed and Sealed this

Eighth Day of July, 2008

JON W. DUDAS
*Director of the United States Patent and Trademark Office*